Figure 1:
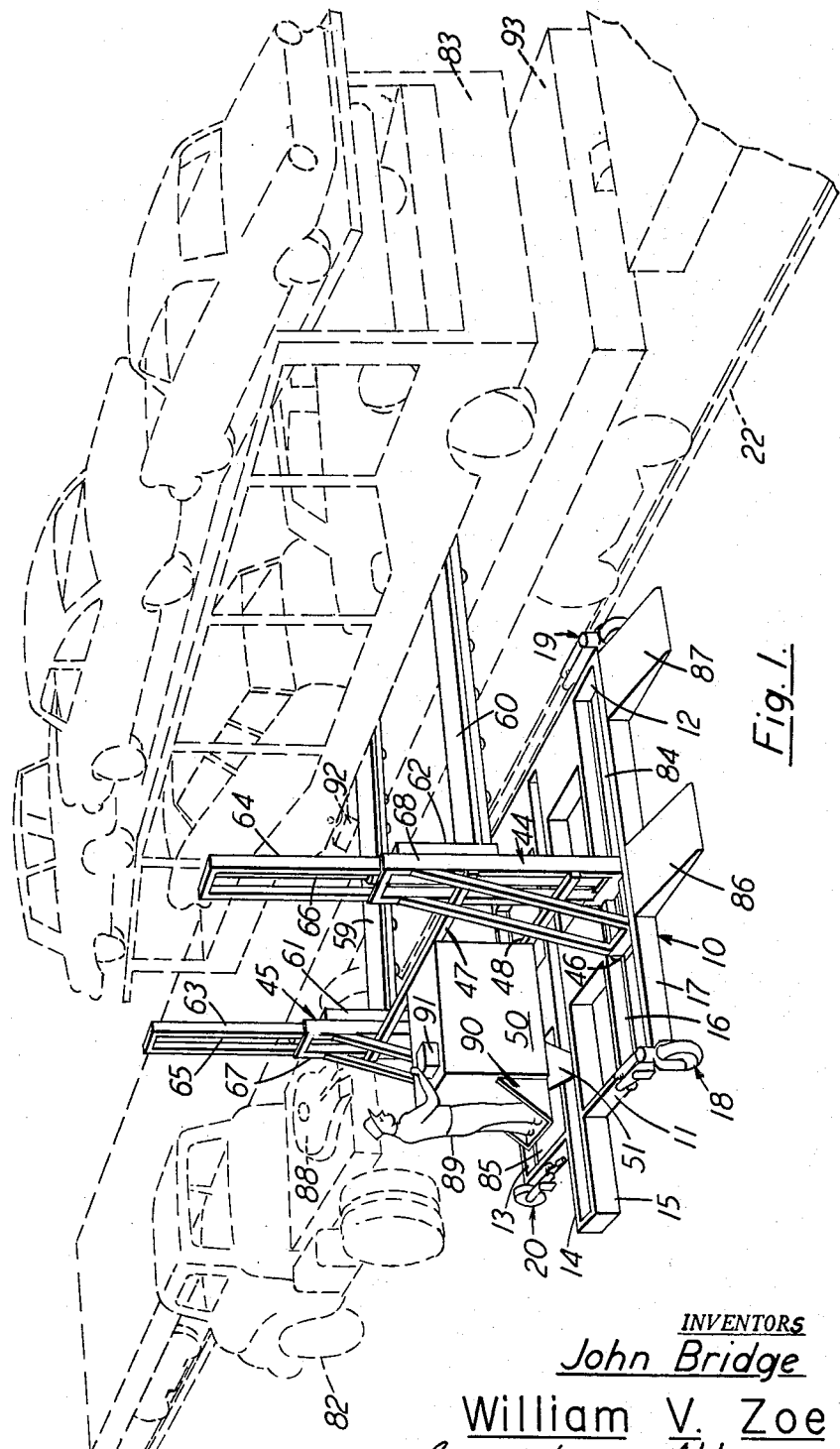

Jan. 28, 1964  J. BRIDGE ETAL  3,119,506
SIDE-LOADING TRANSFER VEHICLE
Filed Sept. 15, 1960  3 Sheets-Sheet 1

INVENTORS
John Bridge
William V. Zoe
Glenn B. Moore, Attorney

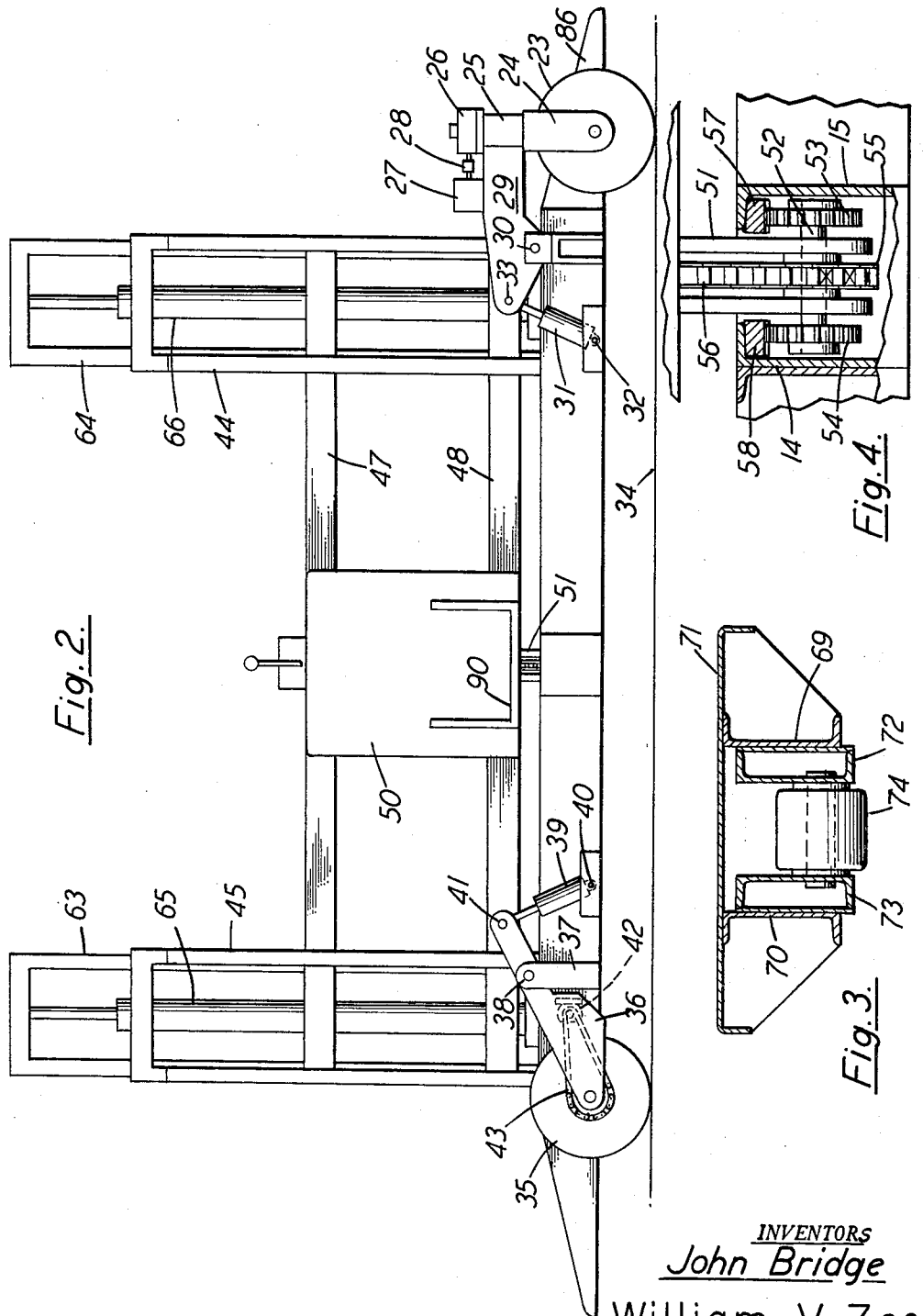

Jan. 28, 1964    J. BRIDGE ETAL    3,119,506
SIDE-LOADING TRANSFER VEHICLE
Filed Sept. 15, 1960    3 Sheets-Sheet 3
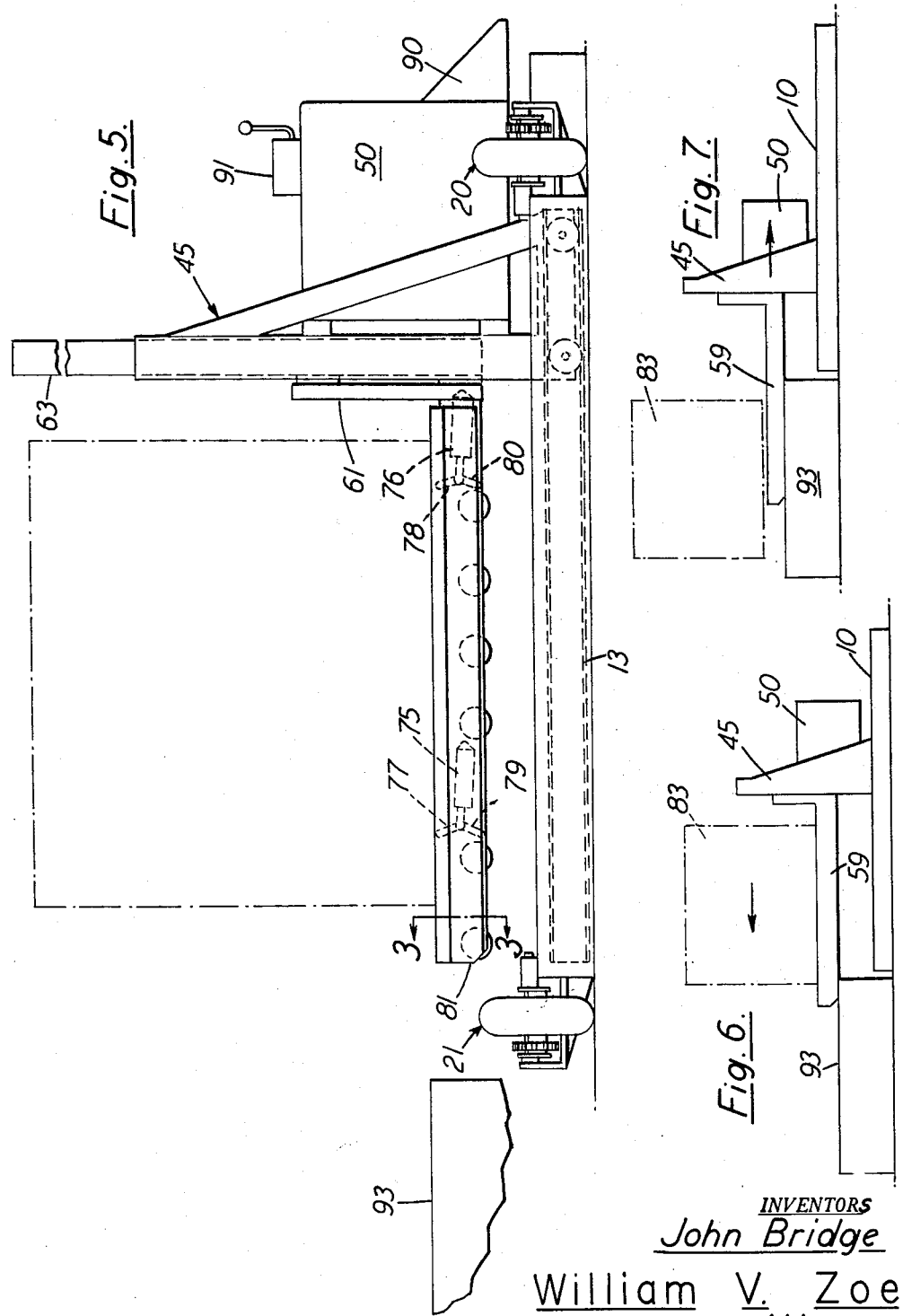
INVENTORS
John Bridge
William V. Zoe
Glenn B. Morris, Attorney United States Patent Office 3,119,506
Patented Jan. 28, 1964

3,119,506
SIDE-LOADING TRANSFER VEHICLE
John Bridge, % Motor Carrier Labor-Advisory Council, 343 S. Dearborn St., Chicago 4, Ill., and William V. Zoe, 10413 S. Eberhart Ave., Chicago 28, Ill.
Filed Sept. 15, 1960, Ser. No. 56,194
1 Claim. (Cl. 214—670)

This invention provides a machine for transferring large articles or containers to and from a horizontal receiving surface. The preferred form of the invention has been adapted to move highway vehicles laterally to and from an assembled group of railroad flatcars, in sequence. Through the use of this machine, a loaded automobile delivery carrier can be moved from engagement with the tractor vehicle, and placed on a flatcar in a side-to-side movement. Having completed its work at one particular flatcar, the machine moves in a direction parallel to the tracks to a position for loading the next car, or a selected car of the assembled group.

It is becoming generally recognized that a combination of highway and railroad transportation of freight items results in remarkable economy, if the problem of transferring the freight from one vehicle to another is adequately provided for. The transportation of loaded highway trailers on railroad flatcars is well-known, but it has been accomplished either through the use of so-called "circus loading," or through highly specialized transfer equipment which has not proved to be entirely satisfactory. The circus loading technique involves the bridging of the gap between an assembled group of railroad flatcars, and then driving an entire group of vehicles from one end of the train to the other so that the loading operation takes place all at once. The obvious disadvantage of this technique is the difficulty of removing or inserting a new load at a car located centrally in the group. Any form of side-loading eliminates this disadvantage, and the present invention provides a highly efficient side-loading operation without requiring a substantial installation of specialized equipment on the flatcar which would commit that car to a particular use.

The preferred form of the invention utilizes a main frame which is primarily an interconnected group of steel beams at one horizontal level. This frame may be placed close enough to the ground for a vehicle to drive over it with the assistance of some relatively small ramp surfaces at each end. The main frame is provided with preferably four wheels, at least two of which are steerable, and all are mounted for vertical adjustment. The individual vertical adjustability of these wheels makes its possible to align the frame with respect to the horizontal, and thus align the vertically-movable lifting platforms mounted on the main frame so that a co-planar alignment with the surface of the railroad flatcar can be maintained regardless of the irregularity of the ground alongside the track. The four ground wheels of the frame are provided for movement of the machine at the side of an assembled train so that work may be done at succeeding cars, or at selected cars from the group. A suitable power-transfer system is preferably incorporated in the device for controlling this movement.

The lifting platforms are preferably mounted on a vertical structure, and function in the manner of a cantilever elevator. In the lowest position, the tops of the lifting platforms are preferably co-planar with the top of the frame so that a vehicle may be driven over the frame and parked in a position such that the operation of the lifting platforms will then pick up the vehicle and lift it to transfer position. In the case of the conventional highway automobile delivery trailer, this lifting movement engages the bottom of the trailer, and picks it up off the fifth wheel of the tractor. The rear wheels of the trailer are left in the same condition as for highway movement, so that the rear of the carrier rests on its wheels when in position on the railroad flatcar. When the lifting platforms have been placed in a position so that a group of rollers on the bottom of the platform are in generally coplanar relationship with the top of the railroad flatcar, a power-actuated mechanism is activated which results in a lateral movement of the lifting platform over on to the deck of the flatcar, with the weight of the automobile carrier being transferred progressively to the flatcar as the rollers on the underside of the lifting and transfer platform come into engagement with the flatcar surface. This arrangement renders it unnecessary to support the tremendous weight of the loaded automobile carrier in a cantilever fashion over beyond the side of the frame of the transfer vehicle. The transfer vehicle therefore is never in a position in which it is in danger of tipping over as a result of eccentric loading.

When the lifting and transfer platform has completed its lateral movement over onto the railroad flatcar, an auxiliary lifting device within the platform itself decreases the distance between the plane of tangency of the rollers on the underside of the platform and the upper supporting surface of the platform, and thereby lowers the automobile carrier on to the flatcar surface. The rear end of the automobile carrier is supported in the conventional manner by its wheels, and the front end may be supported either by an auxiliary bracket in the position of the fifth wheel of a tractor, or by an auxiliary pier or abutment positioned to engage a convenient point on the underside of the trailer near the front end. When the weight of the trailer is supported in this manner, the transfer platform can be withdrawn by the power equipment incorporated in the transfer vehicle, and the work at that particular flatcar is completed except for the possibility of attaching tie-down equipment.

The several features of the invention will be discussed in further detail through an analysis of the embodiments illustrated in the accompanying drawing. In the drawing:

FIGURE 1 presents a perspective view of a machine embodying the preferred form of the invention, with a group of railroad flatcars and a highway automobile delivery carrier shown in dotted lines.

FIGURE 2 preesnts a side elevation of the machine shown in FIGURE 1.

FIGURE 3 presents a section on an enlarged scale on plane 3—3 of FIGURE 5.

FIGURE 4 presents a fragmentary section of the mechanism for inducing transverse movement of the machine.

FIGURE 5 presents an end elevation of the machine illustrated in FIGURE 1.

FIGURES 6 and 7 illustrate schematic views showing steps in the operation of the machine.

Referring to the drawings, the machine includes a base frame generally indicated at 10, and including the longitudinal members 11 and 12, and the transverse members 13—17. The ground wheel units 18—21 are mounted on the main frame, and provide for movement of the machine in a direction generally parallel to the railroad track 22. The wheel units 18 and 19 are similar, and are shown best in FIGURE 2. The wheels 23 are mounted in a fork 24 secured to a vertical shaft received in a bearing 25. The fork is rotatable on a vertical axis, and is rotatably positioned about this axis by the gear box 26 driven by the motor 27 through the coupling 28. This assembly is mounted on a beam 29 pivotally connected to the main frame on the pin 30. The hydraulic actuator 31 is also pivotally connected to the main frame at 32, with the piston rod having a pivotal connection to the beam 29 at the pin 33. Extending the actuator 31 will cause the beam 29 to rotate in a clockwise direction about the pin 30, and thereby raise the main frame with respect to the ground level indicated at 34. This mounting of the wheel assemblies 18 and 19 creates an individual vertical adjustability combined with a steering freedom.

The wheel assemblies 20 and 21 at the opposite end of the machine include the wheels 35 rotatably mounted on the beams 36 which are pivotally connected to a bracket 37 on the main frame at the pin 38. The actuator 39 is connected to the main frame at 40, and to the beam 36 at the pin 41. Extension of the actuator 39 will cause a counterclockwise rotation of the beam 36, and thereby raise that corner of the main frame. A motor unit 42 is mounted on the beam 36, and drives the wheels 35 through the chain 43. Power is thereby applied to the wheels 35, while retaining the freedom of vertical adjustment. The control of the degree of extension of the actuators 31 and 39 is used to establish the horizontal orientation of the machine to maintain an alignment with respect to the top of a railroad flatcar in spite of possible variations of ground level in the area traversed by the machine.

A pair of vertical lifting structures 44 and 45 are respectively mounted on tracks formed by the transverse members 16—17 and 13—14. These members are preferably channel-shaped in cross-section, with the flanges extending toward each other to form tracks or guideways for groups of rollers such as is indicated at 46 in FIGURE 1. The vertical structures 44 and 45 are interconnected by the horizontal beams 47 and 48, which also serve to support the end of the power and control unit 50.

The lateral movement of the vertical lifting structures 44 and 45 is accomplished through the mechanism best shown in FIGURE 4. A bracket 51 extends downward from the power unit 50 into the space between the members 14 and 15. The shaft 52 is rotatably mounted in suitable bearings secured to the bracket 51, and carries the gears 53 and 54. A sprocket 55 is driven by the chain 56 from the power unit 50, and rotation of the gears 53 and 54 results in lateral movement of the vertical structures 44 and 45 as a result of the engagement of the gears with the racks 57 and 58 which are fixed with respect to the beams 14 and 15. It may be noted that the beam 14 is made of two channels in back-to-back relationship, one side forming a guideway for the drive system just described, and the opposite side providing the flanges for the guideway associated with the vertical lifting structure 45. This arrangement can be utilized particularly when it is desired to establish an eccentric relationship between the position of the power unit 50 and the main frame.

The lifting structures 44 and 45 are both provided with a transfer platform as shown at 59 and 60 in FIGURE 1. The details of this portion of the structure are best shown in FIGURE 5, with the transfer platforms including a vertical extension shown at 61. The platforms 61 are secured to the inner telescoping structures 63 and 64 which move upwardly by the action of the hydraulic lifting units 65 and 66. The telescoping units 64 and 65 are slidably received within the lower guide members 67 and 68, which are fixed with respect to the main frame. Suitable conventional hydraulic connections (not shown) from the power unit 50 to the lifting jacks 65 and 66 will control the vertical position of the transfer platforms 59 and 60.

The transfer platforms themselves include the main cantilever beams 69 and 70 interconnected by the deck plate 71. (Refer to FIGURE 3.) A pair of auxiliary beams 72 and 73 provide mountings for the rollers 74. The auxiliary beams 72 and 73 are vertically movable with respect to the cantilever beams 69 and 70, and are positioned through the use of the actuators arranged as shown at 75 and 76 in FIGURE 5. The links 77 and 78 are connected to the cantilever beams 69 and 70, and the links 79 and 80 are connected to the auxiliary beams 72 and 73. The central point on these links is connected to the piston rod of the actuators 75 and 76, respectively, to form a toggle for vertically positioning the deck 71 with respect to the plane of tangency at the underside of the rollers 74. The beams 72 and 73 are restrained with respect to the cantilever beams 69 and 70 against relative horizontal movement by any convenient means such as the presence of the extension 61 at one end and a closure plate at the end indicated at 81.

The operation of the device will normally involve the movement of a tractor such as is indicated at 82 in FIGURE 1, together with its automobile carrier trailer shown at 83, in a direction parallel to the track 22, with the vertical structures 44 and 45 withdrawn as far as possible to the left, referring to FIGURE 1. The lifting platforms 59 and 60 will be lowered into the recesses 84 and 85 so that the top of the lifting platforms is generally coplanar with the top of the main frame. The highway vehicle can then be driven over the main frame through the assistance of the ramps 86 and 87 (together with similarly located ramps at the opposite side of the machine), and the vehicle is then stopped in this position. A locking mechanism at the fifth wheel unit 88 is disconnected, and at that point the operator 89 standing on the step 90 may manipulate the controls 91 to lift the carrier trailer to the approximate level of the top of the railroad car 93.

At this time, the controls may also be adjusted which manipulate the wheel units 18—21 to assure a coplanar alignment between the plane of tangency of the underside of the rollers of the transfer platforms with the top of the flatcar 91. When this has been achieved, the controls of the power unit 50 may be manipulated to begin the lateral movement, with the result that the machine transfers the trailer over into position on the flatcar. It should be noted that the lateral movement results in a transfer of load over to the flatcar progressively as the rollers come into engagement with the surface. At the time that such transfer takes place, the actuators 75 and 76 should be extended to increase the vertical dimension from the top of the deckplate 71 to the plane of tangency of the rollers 74. After the transfer of the carrier has taken place, these actuators can be contracted, resulting in lowering the trailer into a condition such that it is supported by its own rear wheels, and by the engagement of the underside of the trailer with the abutment 92 on the surface of the flatcar. The lifting platforms may then be withdrawn by a movement of the vertical structures 64 and 65 to the left, as shown in FIGURE 1.

The particular embodiments of the present invention which have been illustrated and discussed herein are for illustrative purposes only and are not to be considered as a limitation upon the scope of the appended claim. In this claim, it is our intent to claim the entire invention disclosed herein, except as we are limited by the prior art.

We claim:

A transfer vehicle, comprising: a main frame; ground wheels mounted on said main frame for supporting said vehicle and determining a path of movement; means for selectively altering the vertical position of said wheels with respect to said main frame; track means on said frame disposed transversely with respect to said main frame; at least one upright structure having means engaging said track means for lateral movement with respect to said main frame, said upright structure having a substantially vertical guideway; lifting platform means mounted on said guideway in cantilever relationship to said upright structure, said lifting platform means having roller means on the underside thereof, and also having means for adjusting the vertical distance between said roller means and the top of said lifting platform; means for elevating said lifting platform on said upright structure; and means for moving said upright structure on said track means, said main frame being adapted to receive said lifting platform within the space defined by said main frame to form continuous passage ways across said frame and lifting platform for receiving vehicle wheels.

(References on following page)

References Cited in the file of this patent

UNITED STATES PATENTS

| | | |
|---|---|---|
| 2,720,993 | Lull | Oct. 18, 1955 |
| 2,847,131 | Miller | Aug. 12, 1958 |
| 2,941,686 | Silvester et al. | June 21, 1960 |

FOREIGN PATENTS

| | | |
|---|---|---|
| 964,400 | Germany | May 23, 1957 |
| 1,174,613 | France | Nov. 3, 1958 |
| 820,781 | Great Britain | Sept. 23, 1959 |